United States Patent

Okada et al.

[11] Patent Number: 5,302,470
[45] Date of Patent: Apr. 12, 1994

[54] FUEL CELL POWER GENERATION SYSTEM

[75] Inventors: Osamu Okada; Takeshi Tabata; Masataka Masuda; Susumu Takami; Masamichi Ippommatsu, all of Osaka, Japan

[73] Assignee: Osaka Gas Co., Ltd., Japan

[21] Appl. No.: 921,596

[22] Filed: Jul. 31, 1992

Related U.S. Application Data

[63] Continuation of Ser. No. 635,509, Jun. 15, 1990, abandoned.

[30] Foreign Application Priority Data

May 16, 1989 [JP] Japan .................................. 1-123575
May 17, 1989 [JP] Japan .................................. 1-123420
May 18, 1989 [JP] Japan .................................. 1-125771

[51] Int. Cl.$^5$ .................................................. H01M 8/06
[52] U.S. Cl. ............................................ 429/17; 429/19; 423/244.1
[58] Field of Search ................. 429/17, 19; 423/244

[56] References Cited

U.S. PATENT DOCUMENTS

| 3,669,617 | 6/1972 | Lowicki et al. ............ 423/244 A |
| 3,983,218 | 9/1976 | Heins .......................... 423/244 A |
| 4,455,286 | 6/1984 | Young et al. . |
| 4,816,353 | 3/1989 | Wertheim et al. . |

FOREIGN PATENT DOCUMENTS

320979  6/1989  European Pat. Off. .
60-238389 of 1985 Japan .

OTHER PUBLICATIONS

Derwent WPI Abstracts: No. 73-68070, (Mitsubishi), Corresponds to Jap. 73-4314 (Kokoky).
Supplemntary European Search Report and Annex for Application No. EP 90 90 7417, (Feb. 1992).

*Primary Examiner*—Stephen Kalafut
*Attorney, Agent, or Firm*—Finnegan, Henderson, Farabow, Garrett & Dunner

[57] ABSTRACT

In a fuel cell power generation system for use with a fuel gas which is prepared by desulfurizing a raw fuel material such as naphtha, LPG, town gas, or the like and then, processing it by steam reforming reaction and thus, consists mainly of hydrogen or a process of producing the fuel gas, the desulfurization of the raw fuel material is implemented using a copper/zinc desulfurizing agent. As a result of the desulfurization, the raw fuel material is desulfurized at a higher level and the deterioration of a steam reforming catalyst employed is prevented. Accordingly, steady long-run operation of the fuel cell will be ensured. Also, upon the steam reforming reaction, the S/C (the mole number of steam per one mole of carbon in a raw fuel material) is reduced and thus, the concentration of hydrogen in the fuel gas will be increased providing an improvement in the efficiency of power generation.

11 Claims, 2 Drawing Sheets

FUEL CELL POWER GENERATION SYSTEM

This application is a continuation of application Ser. No. 07/635,509, filed Jun. 15, 1990, now abandoned.

TECHNICAL FIELD

The present invention relates to a fuel cell power generation system and a process of producing a fuel gas for fuel cells and more particularly, to a fuel cell power generation system having an improved supply system of feeding a fuel gas to a fuel electrode for successful operation during a long period of time and a process of producing a fuel gas to be consumed in the system.

BACKGROUND ART

Fuel cells have been known as systems for converting chemical energy derived from raw fuel materials directly to electrical energy. A typical fuel cell consists mainly of a pair of opposing porous electrodes—a fuel electrode and an oxidant electrode—separated by an electrolyte layer holding an electrolyte, in which electricity is generated between the two electrodes by an electrochemical reaction triggered when a fuel, e.g. hydrogen, is directly fed to the back of the fuel electrode and an oxidant, e.g. air, is fed to the back of the oxidant electrode. In operation, amounts of electrical energy are produced at a high conversion rate while both the fuel and the oxidant are supplied continuously. Besides, because of their favorable characteristics to energy saving and environmental conservation, the fuel cells have been studied for practical use.

In such a fuel cell, the fuel (an anode active substance) for feeding to the fuel electrode is commonly hydrogen which is supplied in the form of a fuel gas, containing hydrogen as a primary component, converted by steam reforming reaction from a raw fuel material such as methane, ethane, propane, butane, natural gas, naphtha, kerosine, gas oil, liquefied petroleum gas (LPG), town gas, etc.

It is understood that a sulfur component in the raw fuel material poisons a steam reforming catalyst (e.g. Ru catalyst or Ni catalyst). If the raw fuel material contains, for example, 0.1 ppm of sulfur, about 90% of the surface of a Ru or Ni catalyst will be covered with sulfur in a short time thus losing catalytic activity. Hence, the raw fuel material is initially desulfurized prior to steam reforming process.

Accordingly, a conventional fuel cell power generation system comprises: a desulfurizing unit for desulfurizing a raw fuel material; a fuel reforming section for converting the desulfurized raw fuel material by steam reforming into a fuel gas containing a primary component of hydrogen which is in turn fed to the fuel electrode of a fuel cell; an oxidant feeding section for feeding an amount of oxygen (air) to the oxidant electrode of the fuel cell; and a fuel cell unit for generating electricity by an electrochemical reaction between hydrogen from the fuel gas and oxygen. The desulfurization of a raw fuel material prior to steam reforming process is commonly carried out by hydrogenating desulfurization in which organic sulfur in the raw fuel material is decomposed by hydrogenolysis, for example, at 350° to 400° C. in the presence of Ni-Mo or Co-Mo catalyst and then, resultant $H_2S$ is removed by adsorption on ZnO at 350° to 400° C.

FIG. 1 is a system diagram showing an outline of substantial arrangement of a typical fuel cell power generation system (PC18) which contains a desulfurizing unit for performing the hydrogenating desulfurization and a steam reforming unit. As shown, a raw fuel material 1 is mixed with a fuel gas, which contains hydrogen as a primary component, introduced from a carbon monoxide shift converter 5, described later, and fed to a hydrogenating desulfurization reactor 2a. The hydrogenating desulfurization reactor 2a contains, from entrance, a hydrogenation layer filled with e.g. Ni-Mo or Co-Mo catalyst and an adsorption layer filled with an adsorption desulfurizing agent such as ZnO. The raw fuel material 1 mixed with a portion of the fuel gas derived from the carbon monoxide shift converter 5 is heated up to 350° to 400° C. by a heater (not shown) and then, hydrogenated at the hydrogenation layer so that a sulfur component of the raw fuel material is converted into $H_2S$, which is in turn adsorbed into the adsorption layer, for desulfurization of the same. The desulfurized raw fuel material 1 is mixed with steam in a mixer 3 and transferred to a steam reformer 4 where it is converted by steam reforming reaction into a fuel gas containing hydrogen as a primary component. The resultant fuel gas is then transferred to the carbon monoxide shift converter 5, filled with shift catalyst, where carbon monoxide is converted into hydrogen and carbon dioxide: this procedure is needed for preventing poisoning by carbon monoxide upon the catalyst (e.g. platinum catalyst) of a fuel electrode 7 and also, enhancing efficiency in the conversion to hydrogen. Most of the fuel gas from the carbon monoxide shift converter 5 is supplied as a fuel to the fuel electrode 7 in a phosphoric acid electrolyte fuel cell unit 6 while a small portion of the same is returned to the hydrogenating desulfurization reactor 2a. Hydrogen in the fuel gas introduced into the fuel electrode unit 6 then reacts in electrochemical process with oxygen in the air 9 which is supplied by a compressor 8 into an oxidant electrode 10. As a result of the reaction, a portion of the fuel gas is consumed while a by-product of water is created, and electrical energy is produced which is almost equivalent to a current provided to an electric load 19.

The fuel gas discharged from the fuel electrode 7 is transferred to a burner 11 in the steam reformer 4 where it is mixed with a portion of the air 9 supplied from the compressor 8 and burned for heating the steam reformer 4. A resultant exhaust gas containing steam is transferred from the burner 11 via a heat exchanger 12 to a condenser 13 where it is separated into water and gas. The separated gas is discharged. The condensed water is added to a water supply line 14 which is fed water via a water supply pump 15 and a cooling water pump 16 to the fuel cell unit 6 for cooling purpose. The cooling water is circulated from the fuel cell 6 via a heat exchanger 17 to a gas/water separator 18 for separation into steam and water. The separated water is then returned across the cooling water pump 16 to the fuel cell unit 6 for recirculation and the separated steam is transferred to the mixer 3, where it is mixed with the raw fuel material 1, and then, fed to the steam reformer 4 for use in the steam reforming reaction.

The aforementioned prior art fuel cell power generation system has however some disadvantages to be overcome. At the hydrogenating desulfurization step for desulfurizing the raw fuel material, if organic sulfur contained in the raw fuel material is excessive in amount or hard to be decomposed, e.g. thiophene, it will be slipped off without being decomposed and fail to be adsorbed by ZnO thus passing away. This phenomenon is also unavoidable when the raw fuel material is a gaseous fuel such as a town gas which contains an odorant of hardly decomposable, non-adsorbable organic sulfur such as dimethylsulfide. The hydrogenating desulfurization catalyst is tended to provide catalytic activity at a temperature of more than 350° C. and will hardly react in response to a change in the fuel cell load. Also, the catalyst requires an extra heating device and a flow controller for activation with no warming-up period thus will rarely be reduced in the size.

During the adsorption desulfurization, chemical equilibrium is involved as expressed by:

$$ZnO + H_2S \rightleftharpoons ZnS + H_2O$$

$$ZnO + COS \rightleftharpoons ZnS + CO_2.$$

Hence, the amount of $H_2S$ and COS remains not less than a certain value. Particularly, this will be emphasized while $H_2O$ and $CO_2$ are present. Also, if the desulfurizing section in the entire system is unstable during startup and/or shutdown procedures, sulfur may escape from the adsorption desulfurization catalyst thus increasing the concentration of sulfur in the raw fuel material. For preventive purpose, the desulfurization of the prior art is executed in which the raw fuel material contains surfur in the level of several ppm to 0.1 ppm after refinement. Accordingly, poisoning of the steam reforming catalyst can not be fully suppressed and constant long-run operation of fuel cell will be hardly ensured.

In the prior art fuel cell power generation system, the fuel gas fed to the fuel electrode consists mainly of: hydrogen, a reaction product generated by steam reforming reaction; carbon dioxide generated by carbon monoxide shift reaction; and surplus steam which remains unused during the steam reforming reaction. When a partial pressure of hydrogen in the fuel gas is increased, the efficiency of power generation in the fuel cell becomes improved. It is however difficult to reduce the amount of carbon dioxide in the fuel gas which is released by the carbon monoxide shift reaction. Hence, the task of increasing the hydrogen partial pressure and improving the power generation efficiency in the fuel cell is embodied by decreasing S/C (mole numbers of steam per carbon mole in hydrocarbon in the raw fuel material) during the steam reforming reaction and also, the surplus amount of steam. However, when the S/C is reduced, the concentration of carbon monoxide, a product of steam reforming reaction, in the fuel gas increases even after shift reaction in the carbon monooxide shift converter. The carbon monoxide s now going to poison the catalyst of the fuel electrode in the fuel cell, particularly a platinum catalyst which is commonly employed in a phosphoric acid electrolyte fuel cell operable at a lower temperature, which is in turn deteriorated in properties. In other words, using a fuel gas containing a high concentration of carbon monoxide causes a decrease in the power generation efficiency of a fuel cell.

As described above, the steam reforming catalyst is poisoned by sulfur in the raw fuel material and its catalytic activity is declined, whereby deposition of carbon onto the catalyst surface will be stimulated. For prevention of this action, the S/C is increased in the prior art. If the S/C is decreased, the catalyst activity declines and carbon will be deposited on the catalyst surface causing increase of differential pressure and simultaneously, the raw fuel material itself will be fed to the fuel cell while being incompletely decomposed, preventing the fuel cell to perform a long-run operation without difficulties. Also, the catalyst installed in the steam reformer has to be increased in amount for compensation of a loss caused by the sulfur poisoning of catalyst. As the result, the steam reformer remains not decreased in the size and the overall size of the fuel cell can hardly be minimized.

As understood, although lower S/C in the fuel cell power generation intends to increases the hydrogen partial pressure in the fuel gas, it is difficult to reduce the S/C because the aforementioned drawbacks ar no more negligible. For example, the S/C cannot be less than 3.5 when Ni catalyst is applied as the steam reforming catalyst nor below 2.5 when Ru catalyst, which provides a higher catalytic activity, is applied. The S/C is commonly adjusted for steam reforming reaction to more than 3 with the Ru catalyst and 4 with the Ni catalyst. Thus, the amount of steam in the fuel gas will be increased preventing rise in the partial pressure of hydrogen.

The present invention is directed, for the purpose of elimination of the foregoing disadvantages attribute to the prior art, to an improved fuel cell power generation system in which a raw fuel material is desulfurized at a high enough degree to prevent the deterioration of steam reforming catalyst even if the S/C is low so that steady long-run operation can be ensured and a process of producing a fuel gas which is high in the partial pressure of hydrogen.

DISCLOSURE OF THE INVENTION

A fuel cell power generation system according to the present invention comprises: a desulfurizing unit for desulfurizing a raw fuel material; a fuel reforming section for converting the desulfurized raw fuel material by steam reforming into a fuel gas containing a primary component of hydrogen which is in turn fed to the fuel electrode of a fuel cell; an oxidant feeding section for feeding an amount of oxygen (air) to the oxidant electrode of the fuel cell; a fuel cell unit for generating electricity by an electrochemical reaction between hydrogen from the fuel gas and oxygen; and said desulfurizing unit having at least a desulfurization reactor filled with a copper/zinc desulfurizing agent (referred to as a copper/zinc desulfurization reactor hereinafter). More preferably, the desulfurizing unit may contain, in combination, a copper/zinc desulfurization reactor and an adsorption desulfurization reactor or a hydrogenating desulfurization reactor and a copper/zinc desulfurization reactor, as compared to a solitary copper/zinc desulfurization reactor.

In a process of producing a fuel gas which consists mainly of hydrogen, an improved process of producing a fuel gas according to the present invention comprises the steps of: desulfurizing a raw fuel material with the use of a copper/zinc desulfurizing agent; mixing the raw fuel material with steam at, (1) an S/C of 0.7 to 2.5 when a Ru steam reforming catalyst is employed or (2) an S/C of 1.5 to 3.5 when a Ni steam reforming catalyst is employed; and converting the raw fuel material into a fuel gas containing hydrogen as a primary component by steam reforming reaction on the Ru or Ni catalyst.

In the fuel cell power generation system of the present invention, the raw fuel material is desulfurized by the copper/zinc desulfurization reactor directly or after subjecting to a primary desulfurization using a hydrogenating desulfurization reactor and the like. The copper/zinc desulfurizing agent can decrease sulfur in the raw fuel material to 5 ppb (as sulfur, same hereinafter) or less and more commonly, 0.1 ppb or less. As the result, poisoning of the steam reforming catalyst during the steam reforming reaction is attenuated, whereby the catalytic activity will last long and the steady long-run operation of a fuel cell will be ensured.

In the process of producing a fuel gas of the present invention, a raw fuel material is desulfurized in high grade by using a copper/zinc desulfurization reactor and poisoning of the steam reforming catalyst during the steam reforming reaction can be prevented. As the result, the steam reforming catalyst maintains high activity for a long period of time, and thus, the steam reforming reaction can be carried out even when the S/C is low and the fuel gas having high hydrogen partial pressure will be produced.

BEST MODE FOR CARRYING OUT THE INVENTION

Figure 1:
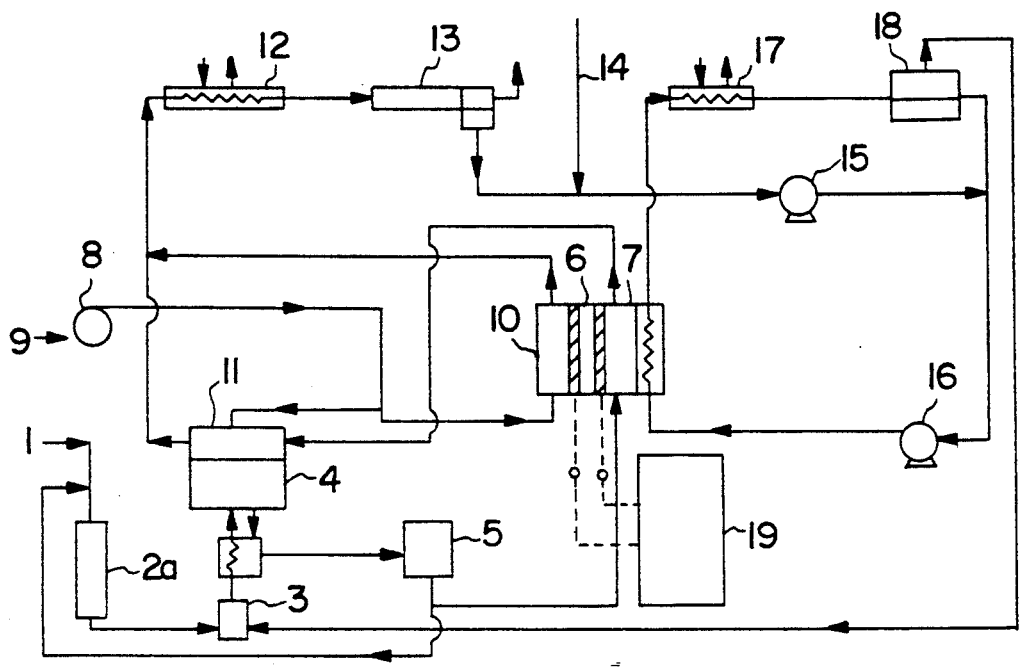
FIG. 1 is a systematic diagram showing the outline of arrangement of a conventional fuel cell power generation system (PC18)

In a fuel cell power generation system and a process of producing a fuel gas according to the present invention, the raw fuel material is to be desulfurized with the use of a copper/zinc desulfurizing agent. The copper/zinc desulfurizing agent to be used means a desulfurizing agent which contains at least copper and zinc component (e.g. zinc oxide) and may further contain aluminum component (e.g. aluminum oxide), chromium component (e.g. chromium oxide), and other appropriate components. Such a preferable copper/zinc desulfurizing agent may be one as disclosed in Japanese Patent Application No. 123627 (1989) or 123628 (1989), which consists mainly of copper and zinc oxide (thus, will be referred to as a Copper/Zinc desulfurizing agent hereinafter) or of copper, zinc oxide, and aluminum oxide (which will be referred to as a Copper/Zinc/Aluminum desulfurizing agent), respectively. More specifically, such desulfurizing agents are prepared by the following manners.

(1) Copper/Zinc desulfurizing agent

With the use of a common type of coprecipitation procedure, precipitates are formed by mixing two solutions: one containing a copper compound (e.g. copper nitrate or copper acetate) and a zinc compound (e.g. zinc nitrate or zinc acetate) and the other containing an alkali substance (e.g. sodium carbonate). The precipitates are then dried and calcined (at about 300° C.) to a mixture of copper oxide and zinc oxide (in atomic ratio, usually Cu:Zn=1:about 0.3 to 10, preferably 1:about 0.5 to 3, or more preferably 1:about 1 to 2.3). The mixture is converted, by reduction at a temperature of about 150° to 300° C. in the presence of a hydrogen gas which has been diluted by an inactive gas (e.g. nitrogen) so as to contain less than 6% or preferably, 0.5 to 4% by volume of hydrogen, into a Copper/Zinc desulfurizing agent, which may contain other ingredients including chromium oxide.

(2) Copper/Zinc/Aluminum desulfurizing agent

Using a common coprecipitation procedure, precipitates are formed by mixing a solution containing a copper compound (e.g. copper nitrate or copper acetate), a zinc compound (e.g. zinc nitrate or zinc acetate), and an aluminum compound (e.g. aluminum nitrate or sodium aluminate) with another solution containing an alkali substance (e.g. sodium carbonate). The precipitates are copper oxide, zinc oxide, and aluminum oxide (in atomic ratio, usually Cu:Zn:Al=1:about 0.3 to 10 about 0.05 to 2, or preferably 1 about 0.6 to 3 about 0.3 to 1). The mixture is then converted, by reduction at a temperature of about 150° to 300° C. in the presence of a hydrogen gas which has been diluted by an inactive gas (e.g. nitrogen) so as to contain less than 6% or preferably, 0.5 to 4% by volume of hydrogen, into a Copper/Zinc/Aluminum desulfurizing agent, which may contain other ingredients including chromium oxide.

Such a copper/zinc desulfurizing agent produced by the foregoing procedure (1) or (2) is found in which a fine particles of copper having a large surface area are uniformly dispersed into the zinc oxide (and the aluminum oxide) and also, maintained in a highly active state. Accordingly, this desulfurizing agent will reduce, when used, the amount of sulfur in a raw fuel material to 5 ppb or less and in common, 0.1 ppb or less. Simultaneously, hard decomposable sulfur compounds including thiophene will fully be eliminated. The desulfurization of a raw fuel material with the copper/zinc desulfurizing agent varies dependent upon, for example, the amount of sulfur in the raw fuel material and is commonly executed by introducing the raw fuel material into the copper/zinc desulfurization reactor under the conditions of a temperature of about 10° to 400° C. or preferably about 150° to 250° C., a pressure of about 0 to 10 kg/cm$^2$·G, and a GHSV (gaseous hourly space velocity) of about 500 to 5000.

If the raw fuel material contains a large amount of sulfur, it is preferable to reduce the amount of contained sulfur in the raw fuel material to 1 to 0.1 ppm by a primary desulfurization prior to the desulfurization with the copper/zinc desulfurizing agent. This can minimize the consumption of the copper/zinc desulfurizing agent. The primary desulfurization is also carried out by a known procedure and preferably, an adsorption desulfurizing process because of the convenience of operation and efficiency. A typical procedure of the adsorption desulfurizing process employs a ZnO desulfurizing agent, in which the amount of sulfur in the raw fuel material will be reduced, for example, to as low as 1 to 0.1 ppm under the conditions of a temperature of about 250° to 400° C., a pressure of about 0 to 10 kg/cm$^2$·G, and a GHSV of about 1000. The adsorption desulfurizing process is not limited to the aforementioned conditions and may be executed under different conditions.

Also, if the raw fuel material contains hard decomposable organic sulfur compounds, e.g. thiophene and dimethylsulfide, it is preferable to subject the raw fuel material to first hydrogenation desulfurization and then, to the above adsorption desulfurization prior to the desulfurization with a copper/zinc desulfurizing agent. This process can lower the amount of sulfur in the raw fuel material and reduce the consumption of the copper/zinc desulfurizing agent. The hydrogenation desulfurization reactor for implementation of the process may comprise, like a known hydrogenation desulfurization reactor, a hydrogenation layer filled with an Ni-Mo or Co-Mo catalyst and an adsorption layer filled with an adsorption desulfurizing agent such as ZnO, in which the hydrogenation desulfurization will be executed in a known manner under the conditions of, but not limited to, a temperature of about 350° to 400° C., a pressure of about 0 to 10 kg/cm$^2$·G, and a GHSV of about 3000.

The raw fuel material desulfurized in the foregoing procedure is mixed with steam and converted by the steam reforming reaction on a Ru or Ni steam reforming catalyst into a fuel gas. The steam reforming reaction is carried out under similar conditions to those of a known steam reforming reaction: for example, an inlet temperature of about 450° to 650° C., an outlet temperature of about 650° to 900° C., and a pressure of about 0 to 10 kg/cm$^2$·G.

In the process of producing a fuel gas according to the present invention the S/C during the steam reforming reaction is controlled to be 0.7 to 2.5 when the Ru steam reforming catalyst is used and 1.5 to 3.5 when the Ni catalyst is used. If the S/C is less than the lowest value in the above range, carbon will be unfavorably deposited on the steam reforming catalyst and if more than the highest value, a partial pressure of the steam in a resultant fuel gas will be increased although the steam reforming reaction proceeds. Those are disadvantageous to the achievement of the present invention.

In this manner, the raw fuel material is converted into a fuel gas which is composed mainly of hydrogen and in turn fed via a carbon monoxide shift converter into the fuel electrode of a fuel cell unit.

The raw fuel material in the present invention is selected from methane, ethane, propane, butane, natural gas, naphtha, kerosine, gas oil, LPG, town gas, and their mixture. The oxidant fed to the oxidant electrode is selected from oxygen, air, compressed air, oxygen-rich air, etc. The type of a fuel cell employed in the present invention is not particularly specified and may use a low-temperature fuel cell (e.g. a phosphoric acid electrolyte fuel cell, a solid polymer electrolyte fuel cell, or a superacid electrolyte fuel cell) or a high-temperature fuel cell (e.g. a molten carbonate fuel cell or a solid oxide electrolyte fuel cell).

The present invention will now be described in more detail referring to the accompanying drawings.

Figure 2:
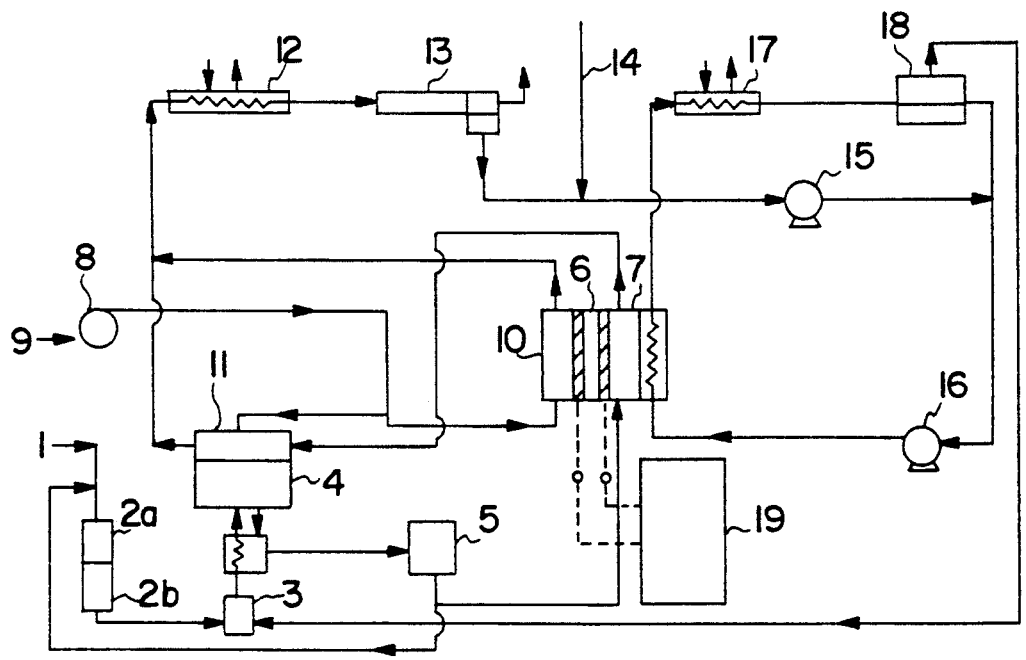
FIGS. 2 and 3 are systematic diagrams of improved fuel cell power generation systems showing the outline of preferred embodiments of the present invention.

FIG. 2 is a systematic diagram showing an outline of typical arrangement of the fuel cell power generation system of the present invention, in which similar numerals represent similar components as illustrated in FIG. 1. The desulfurization reactor in the system consists of a hydrogenation desulfurization reactor 2a and a copper/zinc desulfurization reactor 2b, which is provided in the form of a desulfurization reactor tube filled with, from entrance of a raw fuel material 1, a hydrogenation catalyst, an adsorption catalyst, and a copper/zinc catalyst.

In operation of the system illustrated in FIG. 2, the raw fuel material 1 is mixed at an appropriate ratio with a fuel gas, which consists mainly of hydrogen and is supplied from a carbon monoxide shift converter 5, and transferred to the hydrogenation desulfurization reactor 2a. The hydrogenation desulfurization reactor 2a comprises a hydrogenation layer filled with e.g. an Ni-Mo or Co-Mo catalyst and an adsorption layer filled with an adsorption desulfurizing agent such as ZnO. The raw fuel material 1 is hydrogenated in the hydrogenation layer, for example, under the conditions of a temperature of about 350° to 400° C., a pressure of about 0 to 10 kg/cm$^2$·G, and a GHSV of about 3000 and then, adsorption desulfurized in the adsorption layer, for example, under the condition of a temperature of about 350° to 400° C., a pressure of about 0 to 10 kg/cm$^2$·G, and a GHSV of about 1000, where a primary desulfurization is executed. It should be understood that the conditions during the hydrogenation and adsorption desulfurization are not limited to the above requirements.

The raw fuel material 1 after the primary desulfurization is fed to the copper/zinc desulfurization reactor 2b where it is further desulfurized. The desulfurization in the copper/zinc desulfurization reactor 2b is carried out under the conditions of, for example and not limited to, a temperature of about 10° to 400° C. or preferably about 150° to 400° C., a pressure of about 0 to 10 kg/cm$^2$·G, and a GHSV of about 1000 to 5000. The raw fuel material 1 from the desulfurization reactor 2b contains 5 ppb or less or commonly, 0.1 ppb or less of sulfur.

The desulfurized raw fuel material 1 is then mixed with steam at an appropriate ratio in a mixer 3 and transferred to a steam reformer 4 where it is converted by steam reforming reaction to a fuel gas consisting mainly of hydrogen. The steam reformer 4 is identical to a known steam reforming reaction furnace in the conventional fuel cell system which is commonly filled with a Ru or Ni catalyst. The fuel gas containing hydrogen from the steam reformer 4 is fed to the carbon monoxide shift converter 5 according to the conventional method for decreasing the content of carbon monoxide and increasing the content of hydrogen. The fuel gas is further transferred from the carbon monoxide shift converter 5 to a fuel electrode 7 in a fuel cell unit 6 where it is partially consumed by electrochemical reaction with a supply of air 9 fed by a compressor 8 to an oxidant electrode 10 of the fuel cell unit 6 so that electricity is generated while water is released.

The reuse of a remaining fuel gas discharged from the fuel electrode 7 (e.g. for burning in a burner 11 in order to heat up the steam reformer 4), the disposal of an exhaust gas discharged from the oxidant electrode 10, and the cooling of the fuel cell unit 6 using a cooling water circuit all are the same as those of the prior art system illustrated in FIG. 1.

Figure 3:
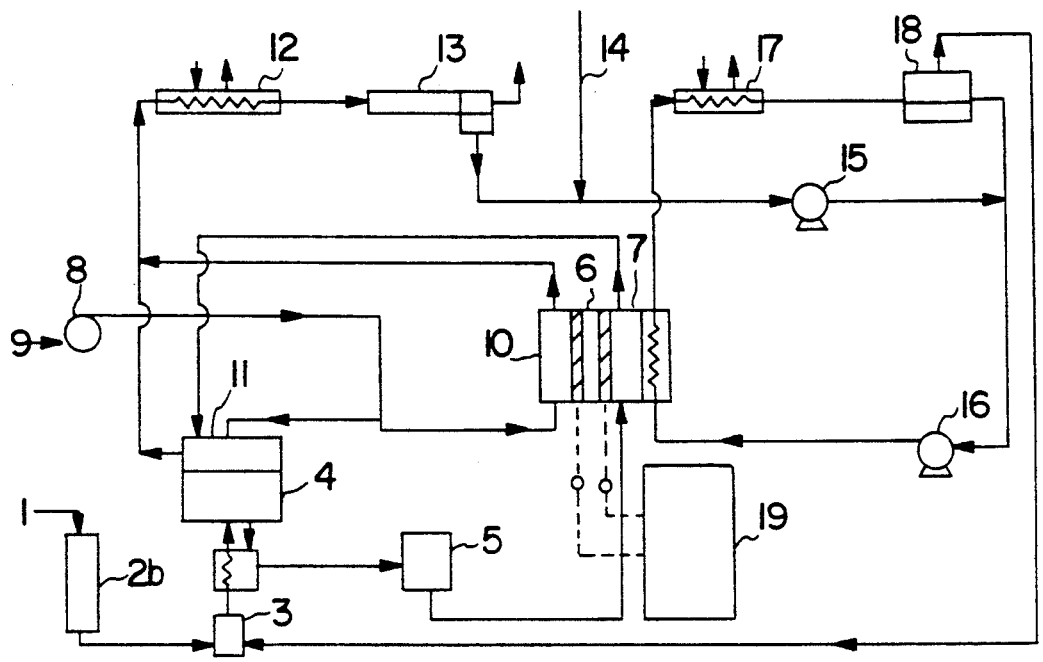

FIG. 3 is a systematic diagram showing another arrangement of the fuel cell power generation system of the present invention, in which similar components are represented by similar numerals as shown in FIG. 1. As shown, the desulfurization reactor consists of a solitary copper/zinc desulfurization reactor 2b, appropriate to the entire fuel cell power generation system for use with a particular raw fuel material such as a hydrocarbon gas containing less amounts of sulfur but also a fair amount of hardly decomposable, nonadsorbable organic sulfur compounds; namely, a town gas containing an odorant of dimethylsulfide.

As shown in FIG. 3, a raw fuel material 1 is, if necessary, preheated by a heater or heat exchanger installed separately and fed to the copper/zinc desulfurization reactor 2b where it is desulfurized under the same conditions as described previously. The raw fuel material 1 from the desulfurization reactor 2b contains a reduced amount of organic sulfur compounds e.g. dimethylsulfide, and 5 ppb or less or in fact, 0.1 ppb or less of sulfur, as having been desulfurized. The raw fuel material 1 is transferred to a mixer 3 where it is processed in the same manner as that of the system illustrated in FIG. 1. More particularly, the raw fuel material 1 is mixed with steam to a proper ratio and converted by the steam reforming reaction in a steam reformer 4 to a fuel gas, consisting mainly of hydrogen, which is in turn fed via a carbon monoxide shift converter 5 into a fuel electrode 7 of a fuel cell unit 6 for producing electrical energy by electrochemical reaction.

The system shown in FIG. 3 does not involve the hydrogenation desulfurization which is carried out at a high temperature with consumption of hydrogen. Accordingly, the desulfurization of fuel at a lower temperature can be ensured and the responding action to a change in the load of the fuel cell will readily be taken. Also, no extra heater for startup procedure nor recirculation line of hydrogen from the steam reformer is needed, whereby the system will be facilitated in the construction and minimized in the overall size.

In the process of producing a fuel gas according to the present invention the S/C during mixing of the raw fuel material 1 with steam at the mixer 3, as shown in FIG. 2 or 3, is arranged to 0.7 to 2.5 when a Ru steam reforming catalyst is used and 1.5 to 3.5 when a Ni steam reforming catalyst is used. Accordingly, the raw fuel material is desulfurized at a higher level and when the S/C is as low as described, the steam reforming catalyst remains highly active, whereby deposition of carbon on the catalyst will be suppressed.

The fuel cell power generation system of the present invention is not limited to the embodiments illustrated in FIGS. 2 and 3 and may be modified for appropriate use without departing the scope of the present invention and also, combined with a variety of known devices or mechanisms. For example, the desulfurization reactor shown in FIG. 2 is composed of a hydrogenating catalyst, an adsorption desulfurizing agent, and a copper/zinc desulfurizing agent accommodated from entrance in the desulfurizing cylinder and may be of a combination of the hydrogenation desulfurization reactor 2a filled with both a hydrogenating catalyst and an adsorption desulfurizing agent and a separated copper/zinc desulfurization reactor 2b filled with a copper/zinc desulfurizing agent. Also, controllers for control of the supply of fuel gas to the fuel electrode 7 and air 9 to the oxidant electrode 10 in response to a load exerted and-/or regulators for control of a differential pressure between the fuel electrode 7 and the oxidant electrode 10 may be added to the systems shown in FIGS. 2 and 3. A plurality of the fuel cell units 6 may be provided as coupled to one another in parallel or series. There may also be provided a mechanism comprising a fuel recirculation fan mounted between a fuel gas supply line and a fuel gas discharge line of the fuel electrode 7 for return a portion of the fuel gas discharged from the fuel electrode 7 back to the same and a mechanism comprising an air recirculation fan mounted between an air supply line and an air discharge line of the oxidant electrode 10 for returning a portion of the discharged air to the oxidant electrode 10. With the use of such recirculation mechanisms, a reactive gas after electrode reaction will be recovered for reuse and the concentration of hydrogen in the discharged fuel gas and of oxygen in the discharged air will be controlled so as to respond to a change in load of the fuel cell. Furthermore, an inverter may be provided between the cell 10 and the load 19, depending on the characteristics of the electric load.

The fuel cell power generation system of the present invention can provide the following advantages.

(1) Since the copper/zinc desulfurizing agent which exhibits a favorable desulfurizing performance and particularly has a high desulfurization activity to hardly decomposable organic sulfurs in a gaseous fuel is employed, the raw fuel material is processed by steam reforming reaction after the high-level desulfurization. Accordingly, the deterioration of a steam reforming catalyst will be prevented an the fuel cell will last long to perform steady operations. Also, the cost of steam reforming catalysts can be lowered and the system itself can be minimized in the overall size.

(2) The high catalytic activity of the steam reforming catalyst is maintained for a long period of time and thus, the operation at a high SV (space velocity) will be possible. Hence, the system will be minimized in the size and the cost of catalysts will be reduced. Also, the operation at a lower S/C will be ensured contributing to increases in the thermal efficiency and power generation efficiency.

The process of producing a fuel gas according to the present invention can provide the following advantages.

(1) The copper/zinc desulfurizing agent is employed ensuring high-level desulfurization of a raw fuel material and thus, poisoning of the steam reforming catalyst during a steam reforming reaction following the desulfurization will be suppressed. Hence, the steam reforming reaction at a lower S/C will be possible and a fuel gas of high hydrogen partial pressure will be (2) The high catalytic activity of the steam reforming catalyst is maintained for a long period of time and thus, the fuel cell will be actuated constantly and extensively with the use of a less amount of reforming catalyst which contributes to reduce the size of reformer.

EXAMPLES

The present invention will then be described in more detail referring to, but not be limited to, some Examples, Reference Examples and Comparison Examples.

REFERENCE EXAMPLE 1

An alkali material of sodium carbonate solution was added to a mixture solution of copper nitrate, zinc nitrate, and aluminum nitrate and then, a resultant precipitate after washed and filtered was formed into tablets, ⅛ inch high and ⅛ inch in diameter, which were in turn calcined at about 400° C. 150 cc of the calcined tablet (copper:zinc:aluminum=about 1:1:0.3 in atomic ratio) was loaded into a desulfurization reactor (having a desulfurizing agent layer of 30 cm long) and using a nitrogen gas containing 2% by volume of hydrogen, reduced at about 200° C. to form a Copper/Zinc-/Aluminum desulfurizing agent. With the desulfurization reactor, a town gas composed of the ingredients listed in Table 1 was desulfurized under the conditions of a temperature of 200° C., a pressure of 1 kg/cm$^2$·G, and a feeding rate of 150 l/h.

TABLE 1

| | |
|---|---|
| methane | 86.9% by volume |
| ethane | 8.1% |
| propane | 3.7% |
| butane | 1.3% |
| odorant: | |
| dimethylsulfide | 3 mg-S/Nm$^3$ |
| t-butylmercaptan | 2 mg-S/Nm$^3$ |

The remaining amount of sulfur in the town gas after desulfurization was measured by a gas chromatograph employing a flame photometric detector (FPD). More particularly, the desulfurized town gas was passed at a given speed through a U-shaped tube trap immersed in a dryice-ethanol bath. As a result, it was found that sulfur compounds only were trapped and condensed in the U-shaped tube while lower hydrocarbon having a lower dew point than the dryice-ethanol temperature (196 K) passed through the tube. After a desired amount of the sulfur compounds was collected by the tube, the exit of the U-shaped tube trap was coupled to the feeding inlet of the gas chromatograph equipped with the FPD. Then, the coolant bath was removed away and the tube was abruptly heated up with a carrier gas being introduced. The sulfur compounds in the tube were then carried by the carrier gas into the FPD chromatograph where they were measured. In that process, the quantitative limitation which depends on a degree of concentration is about 0.1 ppb for ×100 concentration.

The amount of sulfur in the desulfurized town gas was measured 0.1 ppb or less throughout a duration of 1000 hours and after 2000 hours, still remained 0.1 ppm or less.

EXAMPLE 1

An experiment was conducted using the fuel cell power generation system shown in FIG. 2. The steam reformer (having a catalyst layer of about 1 meter long) was filled with 5 l (about 0.8 kg/l in packing density) of a Ru catalyst (2% Ru on $Al_2O_3$ carrier). The desulfurization reactor (having a desulfurizing agent layer of about 50 cm long) was filled with 5 l of a Copper/Zinc-/Aluminum desulfurizing agent at the downstream side of a commercial Ni-Mo hydrogenation desulfurizing catalyst 5 l and a commercial ZnO adsorption desulfurizing agent 10 l. The Copper/Zinc/Aluminum desulfurizing agent was prepared by adding sodium carbonate solution as an alkali material to a mixture solution of copper nitrate, zinc nitrate, and aluminum nitrate, shaping the resultant precipitate by punching, after washing and filtering, to tablets of ⅛ inch high and ⅛ inch in diameter, calcining them at about 400° C. to a calcined tablet (45% copper oxide, 45% zinc oxide, and 10% aluminum oxide), and reducing it at about 200° C. using a nitrogen gas which contains 2% by volume of hydrogen.

A flow (10 $m^3$/h) of town gas composed of the ingredients listed in Table 1 was preparatorily heated to about 380° C. and fed into the desulfurization reactor for desulfurization together with a recirculating reformed gas (i.e. a fuel gas supplied from the carbon monoxide shift converter in recirculation) 2% by volume to the raw fuel material. The resultant desulfurized gas was processed by steam reforming reaction under the conditions of an S/C of 3.3, reaction temperatures of 450° C. (at inlet) and 665° C. (at outlet), and a reaction pressure of 0.2 kg/$cm^2$·G. The fuel gas after the steam reforming was then transferred via the carbon monoxide shift converter to the fuel electrode in the fuel cell unit where it is reacted with air from the oxidant electrode to generate electricity.

At intervals of time during the experiment, the amount of sulfur in the gas at the exit of the desulfurization reactor was measured 0.1 ppb or less even after 2000 hours of operation. The steam reforming catalyst was also proved exhibiting no sign of deterioration in the catalytic activity after the 2000-hour operation and remained at as high as an initial catalytic activity level just after the start of the operation and the fuel cell was enable to perform a normal operation of power generation.

COMPARISON EXAMPLE 1

A similar experiment to Example 1 was carried out with a fuel cell power generation system in which the desulfurization reactor was filled with a commercial ZnO adsorption desulfurizing agent in place of the Copper/Zinc/Aluminum desulfurizing agent employed in Example 1 while no other components were modified.

As the result, the amount of sulfur at the exit of the desulfurization reactor was measured 0.2 ppm just after the start of operation and remained almost the same since. However, the slip amount of methane was increased at the exit of the steam reformer after 500 hours of the operation as followed by a decrease in the output electricity of the fuel cell and finally, the system itself was forced to stop. At the time, the reforming catalyst was found fully deteriorated.

EXAMPLE 2

A raw fuel material of full-range naphtha (containing 100 ppm of sulfur) was supplied in gas phase at 10 l/h and heated to 380° C. for preparation. Then, it was fed together with a recirculating reformed gas, 2% by volume to the raw fuel material, into the desulfurization reactor identical to that of Example 1 for desulfurization. The resultant desulfurized gas was then processed by steam reforming reaction in the same manner as that of Example 1 for operating the fuel cell.

Similarly, at intervals of time during the experiment, the amount of sulfur in the gas at the exit of the desulfurization reactor was measured 0.1 ppb or less even after 2000 hours of operation. The steam reforming catalyst was also proved exhibiting no sign of deterioration in the catalytic activity after the 2000-hour operation and remained at as high as an initial catalytic activity level just after the start of the operation and the fuel cell was enable to perform a normal operation of power generation.

A similar experiment to Example 2 was conducted with the fuel cell power generation system identical to that of Comparison Example 1.

As the result, the amount of sulfur at the exit of the desulfurization reactor was measured 0.4 ppm just after the start of operation and remained almost the same since. However, the slip amount of raw hydrocarbon was increased at the exit of the steam reformer after 200 hours of the operation as followed by a decrease in the output electricity of the fuel cell and finally, the system itself was forced to stop. At the time, the reforming catalyst was found fully deteriorated.

EXAMPLE 3

A raw fuel material of LPG (containing 5 ppm of sulfur) was supplied in gas phase at 10 l/h and heated to 380° C. for preparation. Then, it was fed together with a recirculating reformed gas, 2% by volume to the raw fuel material, into the desulfurization reactor identical to that of Example 1 for desulfurization. The resultant desulfurized gas was then processed by steam reforming reaction in the same manner as that of Example 1 for operating the fuel cell.

At intervals of time during the experiment, the amount of sulfur in the gas at the exit of the desulfurization reactor was measured 0.1 ppb or less even after 2000 hours of operation. The steam reforming catalyst was also proved exhibiting no sign of deterioration in the catalytic activity after the 2000-hour operation and remained at as high as an initial catalytic activity level just after the start of the operation and the fuel cell was enable to perform a normal operation of power generation.

COMPARISON EXAMPLE 3

A similar experiment to Example 3 was conducted with the fuel cell power generation system identical to that of Comparison Example 1.

As the result, the amount of sulfur at the exit of the desulfurization reactor was measured 0.2 ppm just after the start of operation and remained almost the same since. However, the slip amount of raw hydrocarbon was increased at the exit of the steam reformer after 500 hours of the operation as followed by a decrease in the output electricity of the fuel cell and finally, the system itself was forced to stop. At the time, the reforming catalyst was found fully deteriorated.

EXAMPLE 4

A similar experiment to Example 1 was conducted using the desulfurization reactor filled with a Copper/Zinc desulfurizing agent which had been prepared by adding an alkali material of sodium carbonate solution to a mixture solution of copper nitrate and zinc nitrate, shaping the resultant precipitate by punching, after washing and filtering, to tablets of ⅛ inch high and ⅛ inch in diameter, calcining them at about 300° C. to a calcined tablet (copper:zinc=about 1:1 in atomic ratio), and reducing it at about 200° C. using a nitrogen gas which contains 2% by volume of hydrogen.

As the result, the amount of sulfur at the exit of the desulfurization reactor was measured 0.1 ppb or less, like Example 1. The deterioration of the steam reforming catalyst was prevented and the fuel cell was enable to perform a normal operation.

EXAMPLE 5

Another experiment was conducted using the fuel cell power generation system shown in FIG. 3. The steam reformer (having a catalyst layer of about 1 meter long) was filled with 5 l (about 0.8 kg/l in packing density) of a Ru catalyst (2% Ru on $Al_2O_3$ carrier). The desulfurization reactor (having a desulfurizing agent layer of about 50 cm long) was filled with 20 l of a Copper/Zinc desulfurizing agent which had been prepared by adding an alkali material of sodium carbonate solution to a mixture solution of copper nitrate and zinc nitrate, shaping a resultant precipitate by punching, after washing and filtering, to tablets of ⅛ inch high and ⅛ inch in diameter, calcining them at about 300° C. to a calcined tablet (copper:zinc=about 1:1 in atomic ratio), and reducing it at about 200° C. using a nitrogen The town gas composed of the ingredients listed in Table 1 was preparatorily heated to about 200° C. and fed at a rate of 10 m³/h into the desulfurization reactor for desulfurization. The resultant desulfurized gas was then supplied into the steam reformer where it was processed by steam reforming reaction under the conditions of an S/C of 3.3, reaction temperatures of 450° C. (inlet) and 665° C. (outlet), and a reaction pressure of 0.2 kg/cm²·G. The fuel gas after the steam reforming was then transferred via the carbon monoxide shift converter to the fuel electrode in the fuel cell unit where it reacted with air from the oxidant electrode to generate electricity.

At intervals of time during the experiment, the amount of sulfur in the gas at the exit of the desulfurization reactor was measured 0.1 ppb or less even after 2000 hours of operation. The steam reforming catalyst was also proved exhibiting no sign of deterioration in the catalytic activity after the 2000-hour operation and remained at as high as an initial catalytic activity level just after the start of the operation and the fuel cell was enable to perform a normal operation of power generation.

EXAMPLE 6

A heater and a cooler were temporarily installed at the upstream of the desulfurization reactor in the fuel cell power generation system of Example 5 for the purpose of either heating or cooling of the raw fuel material while the other components remained unchanged. Then, during the actuation of the system, the temperature about the entrance of the desulfurization reactor was repeatedly varied at equal intervals of 8 hours by a cycle procedure of decreasing to about 20° C. in a period of 15 minutes and increasing back to about 200° C. in another 15-minute period. This simulates the operating conditions of the desulfurization reactor caused by the startup and shutdown actions of the fuel cell power generation system.

As the result, the amount of sulfur at the exit of the desulfurization reactor was measured 0.1 ppb or less after 2000 hours of operation, like Example 5. No deterioration of the steam reforming catalyst was detected and the fuel cell was enable to perform a normal operation.

COMPARISON EXAMPLE 4

A similar pattern operation to that of Example 6 was carried out using the fuel cell power generation system of Comparison Example 1, in which the temperature at the entrance of the desulfurization reactor was limited to a range from 20° C. to 380° C. (a normal temperature).

As the result, the amount of sulfur at the exit of the desulfurization reactor was measured 0.2 ppm at the normal temperature and as high as 3 ppm at a lower temperature. Also, the slip amount of hydrocarbon was increased at the exit of the steam reformer after 200 hours of the operation as followed by a decrease in the output electricity of the fuel cell and finally, the system itself was forced to stop. At the time, the reforming catalyst was found fully deteriorated.

EXAMPLE 7

A similar experiment to Example 5 was conducted using the desulfurization reactor filled with a Copper/Zinc/Aluminum desulfurizing agent which had been prepared by adding an alkali material of sodium carbonate solution to a mixture solution of copper nitrate, zinc nitrate, and aluminum nitrate, shaping the resultant precipitate by punching, after washing and filtering, to tablets of ⅛ inch high and ⅛ inch in diameter, calcining them at about 400° C. to a calcined tablet (45% copper oxide, 45% zinc oxide, and 10% aluminum oxide), and reducing it at about 200° C. using a nitrogen gas which contains 2% by volume of hydrogen.

As the result, the amount of sulfur at the exit of the desulfurization reactor was measured 0.1 ppb or less, like Example 5. The deterioration of the steam reforming catalyst was thus prevented and the fuel cell was enable to perform a normal operation.

Naphtha containing 100 ppm of sulfur was processed by a common procedure of hydrogenation desulfurization in the presence of an Ni-Mo hydrogenating catalyst under the conditions of a temperature of 380° C., a pressure of 8 kg/cm$^2$·G, an LHSV (liquid hourly space velocity) of 2, and a hydrogen/naphtha (molar) ratio of 1/10 and subjecting to adsorption desulfurization using a ZnO adsorption desulfurizing agent. The amount of sulfur in the resultant primarily desulfurized naphtha was measured about 2 ppm.

Also, a sodium carbonate solution as an alkali material was added to a mixture solution of copper nitrate, zinc nitrate, and aluminum nitrate and then, the resultant precipitate after washed and filtered was formed into tablets, $\frac{1}{8}$ inch high and $\frac{1}{8}$ inch in diameter, which were in turn calcined at about 400° C. 100 cc of the calcined tablet (45% copper oxide, 45% zinc oxide, and 10% aluminum oxide) was packed into a desulfurization reactor and reduced at about 200° C. using nitrogen gas containing 2% by volume of hydrogen, to form a Copper/Zinc/Aluminum desulfurizing agent. As being transferred at a rate of 400 l/h across the above desulfurizing agent, the primarily desulfurized naphtha was desulfurized under the conditions of a temperature of 350° C. and a pressure of 8 kg/cm$^2$·G. The amount of sulfur contained in the desulfurized naphtha remained 0.1 ppb or less during 7000 hours of operation.

Using a flow type quasi-adiabatic reactor (20 mm in diameter), the highly desulfurized naphtha obtained above serving as a raw fuel material was processed by low-temperature steam reforming reaction with S/C being varied, in the presence of a Ru catalyst (2% by weight of Ru on a γ-alumina carrier) or Ni catalyst (containing 50% by weight of NiO and prepared by coprecipitation process) under the conditions shown in Table 2. Then, the amount of carbon deposited on the catalyst at the entrance of the reactor was measured.

TABLE 2

| Reaction temperature (entrance) | 490° C. (adiabatic) |
|---|---|
| Reaction pressure | 8 kg/cm$^2$ · G |
| Flow of naphtha | 160 cc/h |
| Catalyst | 100 cc |
| H$_2$/naphtha | 0.1 (molar ratio) |

Figure 4:
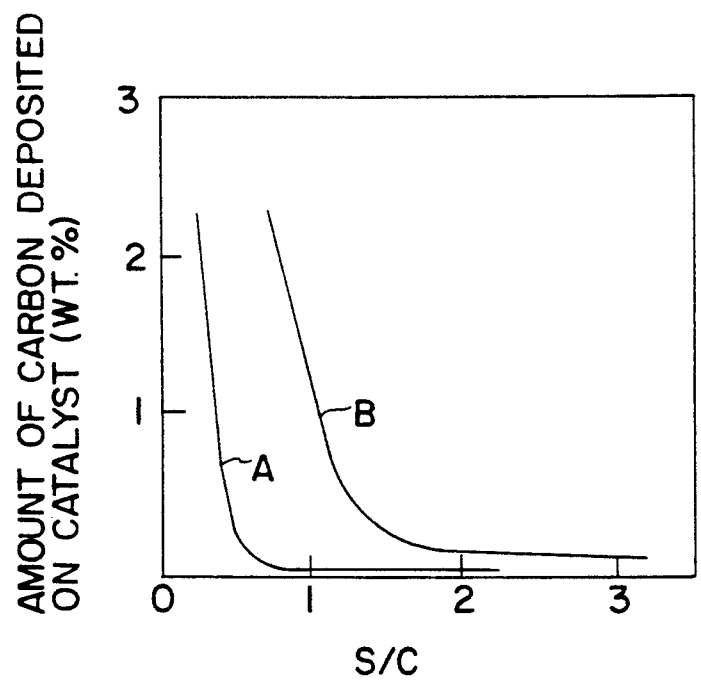
FIG. 4 is a diagram showing the relation between an S/C and an amount of carbon deposited on a catalyst during the steam reforming reaction.

FIG. 4 shows the relation between the S/C and the deposition of carbon on the catalyst at the entrance of the reactor, in which the curve A represents the case of a Ru catalyst and the curve B represents a Ni catalyst.

As apparent from FIG. 4, no carbon was substantially accumulated on the catalyst when the S/C was as low as 0.7 with the Ru catalyst and 1.5 with the Ni catalyst.

On the other hand, as the result from an equal experiment using the primarily desulfurized naphtha containing about 2 ppm of sulfur, the deposition of carbon on the catalyst was detected when the S/C was below 2.5 with the Ru catalyst and 3.5 with the Ni catalyst.

EXAMPLE 8

A further experiment was conducted using the fuel cell power generation system shown in FIG. 2 equipped with the steam reformer and desulfurization reactor identical to those of Example 1. The steam reformer (having a catalyst layer of about 1 meter long) was filled with 5 l (about 0.8 kg/l in packing density) of a Ru catalyst (2% Ru on Al$_2$O$_3$ carrier). Also, the desulfurization reactor (having a desulfurizing agent layer of about 50 cm long) was filled with 5 l of the Copper/Zinc/Aluminum desulfurizing agent at the downstream of 5 l of a commercial Ni-Mo hydrogenating catalyst and 10 l of a commercial ZnO adsorption desulfurizing agent.

A flow (10 m$^3$/h) of town gas composed of the ingredients listed in Table 1 was preheated to about 380° C. and fed together with 0.2 Nm$^3$/h of a recirculating reformed gas into the desulfurization reactor for desulfurization. The resultant desulfurized gas was then processed by steam reforming reaction under the conditions of an S/C of 2.0, reaction temperatures of 450° C. (inlet) and 665° C. (outlet), and a reaction pressure of 0.2 kg/cm$^2$·G. The fuel gas after the steam reforming was then processed, under the conditions of an exit temperature of 190° C. and a reaction pressure of 0.2 kg/cm$^2$·G, in a heat-exchanger type carbon monoxide shift converter filled with a commercial low-temperature carbon monoxide shift catalyst (equivalent to G-66B) and transferred to the fuel electrode in the fuel cell unit where it reacted with air from the oxidant electrode to generate electricity.

Then, the composition of the fuel gas was examined at the exit of the steam reformer and the exit of the carbon monoxide shift converter. The resultant measurements are shown in Table 3 (as will be read in percent by volume hereinafter).

TABLE 3

|  | At steam reformer exit | At CO converter exit |
|---|---|---|
| H$_2$ | 58.5 | 69.2 |
| CH$_4$ | 3.9 | 3.9 |
| CO | 11.5 | 0.8 |
| CO$_2$ | 6.8 | 17.6 |
| H$_2$O | 19.3 | 8.5 |

At intervals of time during the experiment, the amount of sulfur in the gas at the exit of the desulfurization reactor was measured 0.1 ppb or less even after 2000 hours of operation. The steam reforming catalyst was also proved exhibiting no sign of deterioration in the catalytic activity after the 2000-hour operation and remained at as high as an initial catalytic activity level just after the start of the operation. Hence, the fuel cell was enable to perform a normal operation of power generation when the S/C was relatively low.

COMPARISON EXAMPLE 5

A similar experiment to Example 8 was conducted, except that the S/C was set to 3.0. Then, the composition of the fuel gas was examined at the exit of the steam reformer and the exit of the carbon monoxide shift converter. The resultant measurements are shown in Table 4.

TABLE 4

|  | At steam reformer exit | At CO converter exit |
|---|---|---|
| H$_2$ | 53.7 | 61.6 |
| CH$_4$ | 1.4 | 1.4 |
| CO | 8.2 | 0.3 |
| CO$_2$ | 8.0 | 15.9 |
| H$_2$O | 28.7 | 20.8 |

As apparent from Table 4, in case of an S/C of 3.0, the amount of steam in the fuel gas discharged from the carbon monoxide shift converter is remarkably increased while the amount of hydrogen in the same is decreased.

COMPARISON EXAMPLE 6

A similar experiment to Example 8 was carried out using a like fuel cell power generation system in which the desulfurization reactor was filled with an equal amount of a commercial ZnO adsorption desulfurizing agent in place of the Copper/Zinc/Aluminum desulfurizing agent.

As the result, the amount of sulfur at the exit of the desulfurization reactor was measured 0.2 ppm and remained substantially unchanged since. However, after 500 hours of the operation, the slip amount of methane was increased at the exit of the steam reformer as followed by a decrease in the output electricity of the fuel cell and finally, the system itself was forced to stop. At the time, the reforming catalyst was found fully deteriorated.

EXAMPLE 9

A raw fuel material of full-range naphtha (containing 100 ppm of sulfur) was supplied in gas phase at 10 l/h and heated to 380° C. for preparation. Then, it was fed together with 0.2 Nm$^3$/h of a recirculating reformed gas into the desulfurization reactor identical to that of Example 8 for desulfurization. A resultant desulfurized gas was then processed by steam reforming reaction in the same manner as of Example 8 for operating the fuel cell.

The composition of the fuel gas was examined at the exit of the steam reformer and the exit of the carbon monoxide shift converter. The resultant measurements are shown in Table 5.

TABLE 5

|  | At steam reformer exit | At CO converter exit |
|---|---|---|
| $H_2$ | 53.5 | 66.1 |
| $CH_4$ | 3.4 | 3.4 |
| CO | 13.6 | 1.0 |
| $CO_2$ | 9.3 | 22.0 |
| $H_2O$ | 20.2 | 7.6 |

At intervals of time during the experiment, the amount of sulfur in the gas at the exit of the desulfurization reactor was measured 0.1 ppb or less even after 2000 hours of operation. The steam reforming catalyst was also proved exhibiting no sign of deterioration in the catalytic activity after the 2000-hour operation and remained at as high as an initial catalytic activity level just after the start of the operation. The fuel cell was enable to perform a normal operation of power generation when the S/C was relatively low.

COMPARISON EXAMPLE 7

A similar experiment to Example 9 was conducted using the same system as of Comparison Example 6.

As the result, the amount of sulfur at the exit of the desulfurization reactor was measured 0.4 ppm just after the start of the operation and remained substantially unchanged since. However, after 200 hours of the operation, the slip amount of raw hydrocarbon was increased at the exit of the steam reformer as followed by a decrease in the output electricity of the fuel cell and finally, the system itself was forced to stop At the time, the reforming catalyst was found fully deteriorated.

EXAMPLE 10

A raw fuel material of LPG (containing 5 ppm of sulfur) was supplied in gas phase at 10 l/h and heated to 380° C. for preparation. Then, it was fed together with 0.2 Nm$^3$/h of a recirculating reformed gas into a desulfurization reactor identical to that of Example 8 for desulfurization. A resultant desulfurized gas was then processed by steam reforming reaction in the same manner as that of Example 8 for operating the fuel cell.

The composition of the fuel gas was examined at the exit of the steam reformer and the exit of the carbon monoxide shift converter. The resultant measurements are shown in Table 6.

TABLE 6

|  | At steam reformer exit | At CO converter exit |
|---|---|---|
| $H_2$ | 54.8 | 67.0 |
| $CH_4$ | 3.5 | 3.5 |
| CO | 13.1 | 0.9 |
| $CO_2$ | 8.6 | 20.8 |
| $H_2O$ | 20.0 | 7.8 |

At intervals of time during the experiment, the amount of sulfur in the gas at the exit of the desulfurization reactor was measured 0.1 ppb or less even after 2000 hours of operation. The steam reforming catalyst was also proved exhibiting no sign of deterioration in the catalytic activity after the 2000-hour operation and remained at as high as an initial catalytic activity level just after the start of the operation. The fuel cell was enable to perform a normal operation of power generation when the S/C was relatively low.

COMPARISON EXAMPLE 8

A similar experiment to Example 10 was conducted using the same system as that of Comparison Example 6.

As the result, the amount of sulfur at the exit of the desulfurization reactor was measured 0.2 ppm just after the start of the operation and remained substantially unchanged since. However, after 500 hours of the operation, the slip amount of raw hydrocarbon was increased at the exit of the steam reformer as followed by a decrease in the output electricity of the fuel cell and finally, the system itself was forced to stop. At the time, the reforming catalyst was found fully deteriorated.

EXAMPLE 11

A further experiment was conducted using the fuel cell power generation system shown in FIG. 3 equipped with the steam reformer and the desulfurization reactor identical to those of Example 5. The steam reformer (having a catalyst layer of about 1 meter long) was filled with 5 l (about 0.8 kg/l in packing density) of a Ru catalyst (2% Ru on $Al_2O_3$ carrier). Also, the desulfurization reactor (having a desulfurizing agent layer of about 50 cm long) was filled with 20 l of the Copper/Zinc desulfurizing agent.

As raw fuel material, the town gas composed of the ingredients listed in Table 1 was preheated to about 170° C. and supplied at a feeding rate of 10 m$^3$/h into the desulfurization reactor for desulfurization. The resultant desulfurized gas was then transferred to the steam reformer where it was processed by steam reforming reaction under the conditions of an S/C of 2.2, reaction temperatures of 450° C. (at entrance) and 665° C. (at exit), and a reaction pressure of 0.2 kg/cm$^2$·G. The fuel gas after the steam reforming was then processed, under the conditions of an exit temperature of 190° C. and a reaction pressure of 0.2 kg/cm$^2$·G, in a heat-exchanger type carbon monoxide shift converter filled with a commercial low-temperature carbon monoxide shift catalyst (equivalent to G-66B) and transferred to the fuel electrode in the fuel cell unit where it reacted with air from the oxidant electrode to generate electricity.

Then, the composition of the fuel gas was examined at the exit of the steam reformer and the exit of the carbon monoxide shift converter. The resultant measurements are shown in Table 7.

TABLE 7

|  | At steam reformer exit | At CO converter exit |
| --- | --- | --- |
| $H_2$ | 57.6 | 67.8 |
| $CH_4$ | 3.1 | 3.1 |
| CO | 10.7 | 0.6 |
| $CO_2$ | 7.2 | 17.4 |
| $H_2O$ | 21.3 | 11.1 |

At intervals of time during the experiment, the amount of sulfur in the gas at the exit of the desulfurization reactor was measured 0.1 ppb or less even catalyst was also proved exhibiting no sign of deterioration in the catalytic activity after the 2000-hour operation and remained at as high as an initial catalytic activity level just after the start of the operation. Hence, the fuel cell was enable to perform a normal operation of power generation when the S/C was relatively low.

EXAMPLE 12

A similar experiment to Example 11 was carried out, except that the steam reforming catalyst was a Ni catalyst (containing 14% of Ni) and the S/C was set to 2.5.

Then, the composition of the resultant fuel gas was examined at the exit of the steam reformer and the exit of the carbon monoxide shift converter. The measurements are shown in Table 8. The amount of sulfur in the gas at the exit of the desulfurization reactor was also found 0.1 ppb or less after 2000 hours of operation. The steam reforming catalyst exhibited no sign of deterioration in the catalytic activity after the 2000-hour operation and remained at as high as an initial catalytic activity level just after the start of the operation. Hence, the fuel cell was enable to perform a normal operation when the S/C was relatively low.

TABLE 8

|  | At steam reformer exit | At CO converter exit |
| --- | --- | --- |
| $H_2$ | 56.2 | 65.5 |
| $CH_4$ | 2.3 | 2.3 |
| CO | 9.7 | 0.4 |
| $CO_2$ | 7.6 | 16.9 |
| $H_2O$ | 24.2 | 14.9 |

We claim:

1. A fuel cell power generation system comprising: a source of a hydrocarbon raw fuel material, a desulfurizing unit for desulfurizing the raw fuel material; a fuel reforming section for converting the desulfurizing raw fuel material by a steam reforming reaction into a fuel gas which consists mainly of hydrogen and in turn, is fed to the fuel electrode of a fuel cell; an oxidant feeding section for feeding an oxidant to the oxidant electrode of the fuel cell; and a fuel cell unit for generating electricity by an electrochemical reaction between hydrogen from the fuel gas and oxygen from the oxidant, wherein said desulfurizing unit has at least a copper/zinc desulfurization reactor containing a desulfurizing agent comprising at least copper and a zinc component, and the amount of sulfur in the raw fuel material is reduced to 5 ppb or less by desulfurization in the desulfurization unit.

2. A fuel cell power generation system according to claim 1, wherein the desulfurizing unit is formed of a single copper/zinc desulfurization reactor, of a hydrogenation desulfurization reactor and a copper/zinc desulfurization reactor in combination, or of an adsorption desulfurization reactor and a copper/zinc desulfurization reactor in combination.

3. A fuel cell power generation system according to claim 2, wherein the amount of sulfur in the raw fuel material is reduced to 0.1 ppb or less by desulfurization in the desulfurizing unit.

4. A fuel cell power generation system according to claim 2 or 3, wherein said desulfurizing agent is obtained by hydrogen reduction of a mixture of copper oxide and zinc oxide prepared by coprecipitation using both a copper compound and a zinc compound or a mixture of copper oxide, zinc oxide, and aluminum oxide prepared by coprecipitation using a copper compound, a zinc compound, and an aluminum compound.

5. A fuel cell power generation system according to claim 1, wherein the raw fuel material is methane, ethane, propane, butane, natural gas, naphtha, kerosine, gas oil, liquid propane gas, town gas, or their mixture.

6. A process of producing a fuel gas, which consists mainly of hydrogen, for use in fuel cell, comprising the steps of: desulfurizing a raw fuel material to provide a desulfurized raw fuel material having a sulfur content of 5 ppb or less using a copper/zinc desulfurizing agent comprising copper and a zinc component; mixing the desulfurized raw fuel material with steam at, (1) an S/C of 0.7 to 2.5 when a Ru steam reforming catalyst is used or, (2) an S/C or 1.5 to 3.5 when a Ni steam reforming catalyst is used; and converting the resulting desulfurized raw fuel material by a steam reforming reaction on the Ru or Ni catalyst into a fuel gas of which the primary component is hydrogen.

7. A process for producing a fuel gas according to claim 6, wherein the resulting desulfurized raw fuel material has a sulfur content of 0.1 ppb or less.

8. A process of producing a fuel gas according to claim 6 or 7, wherein the copper/zinc desulfurizing agent is obtained by hydrogen reduction of a mixture of copper oxide and zinc oxide prepared by coprecipitation using both a copper compound and a zinc compound or obtained by hydrogen reduction of a mixture of copper oxide, zinc oxide, and aluminum oxide prepared by coprecipitation using a copper compound, a zinc compound, and an aluminum compound.

9. A process of generating electricity comprising conducting an electrochemical reaction between hydrogen in the fuel gas produced by the process according to claim 9 and oxygen in an oxidant, wherein said electrochemical reaction is conducted in a phosphoric acid electrolyte fuel cell.

10. A process of producing a fuel gas according to claim 6, wherein the raw fuel material is methane, ethane, propane, butane, natural gas, naphtha, kerosine, gas oil, liquid propane gas, town gas, or their mixture.

11. A process of producing a fuel gas according to claim 6, wherein said desulfurization is conducted at a temperature of from 10° to 400° C.

* * * * *